US006056152A

United States Patent [19]
Gonzalez

[11] Patent Number: 6,056,152

[45] Date of Patent: May 2, 2000

[54] APPARATUS FOR DISPENSING REFRIGERATING ELEMENTS AND SAID REFRIGERATING ELEMENTS

[75] Inventor: Alvaro Gonzalez, Sochaux, France

[73] Assignee: Leonetti, Phillippe, Rambervillers, France

[21] Appl. No.: 08/952,198

[22] PCT Filed: Mar. 7, 1997

[86] PCT No.: PCT/FR97/00404

§ 371 Date: Nov. 10, 1997

§ 102(e) Date: Nov. 10, 1997

[87] PCT Pub. No.: WO97/34264

PCT Pub. Date: Sep. 18, 1997

[30] Foreign Application Priority Data

Mar. 11, 1996 [FR] France .................................. 96 03192

[51] Int. Cl.[7] .................................................. B65G 59/00

[52] U.S. Cl. .................... 221/150 R; 221/281; 221/199; 221/312 A; 15/88.3; 62/530; 62/378

[58] Field of Search .............................. 221/150 R, 281, 221/199, 312 R, 312 A, 268, 270, 210, 220; 15/77, 88.2, 88.3, 102; 62/530, 529, 457.6, 400, 378

[56] References Cited

U.S. PATENT DOCUMENTS

| | | | |
|---|---|---|---|
| 1,789,300 | 1/1931 | Bihl et al. | 221/150 R |
| 2,562,288 | 7/1951 | Wegman | 221/281 |
| 2,805,841 | 9/1957 | Kyle | 62/378 |
| 4,175,665 | 11/1979 | Dogliotti | 221/312 R |
| 4,671,426 | 6/1987 | Grossi | 221/312 R |

FOREIGN PATENT DOCUMENTS

| | | | |
|---|---|---|---|
| 0140153A | 5/1985 | European Pat. Off. . | |
| 2258672A | 8/1975 | France . | |
| 2205964A | 8/1972 | Germany . | |
| 3215627A | 11/1983 | Germany . | |
| 404054589 | 2/1992 | Japan | 221/150 R |

*Primary Examiner*—Christopher P. Ellis
*Assistant Examiner*—Khoi H. Tran
*Attorney, Agent, or Firm*—Davis and Bujold

[57] ABSTRACT

A piece of apparatus for dispensing refrigerating elements enabling consumers to make sure that the cold chain is not broken when buying fresh and frozen food. The apparatus (101) for dispensing refrigerating elements (11) comprises a housing (102) in which is provided an outlet (104) in an upper zone (129) thereof making it possible to insert a refrigerating element (11) to be recycled and an outlet (105) provided in a lower zone (128) of the housing (102) making it possible to dispense a refrigerating element loaded with negative calories, and at least one refrigerated storage unit (107) provided with a helicoidal storage and guide rail (108) extending substantially between the two zones (128, 129) so that the refrigerating elements (11) move toward the lower zone during storage. A cleaning device (112) for cleaning the refrigerating elements (11) to be recycled is provided and comprises rotating brushes (113) which drive said elements from the inlet (104) to the storage unit (107). Likewise, a ram (121) is provided to push a refrigerating element loaded with negative calories from the storage unit (107) toward the outlet (105).

27 Claims, 9 Drawing Sheets

APPARATUS FOR DISPENSING REFRIGERATING ELEMENTS AND SAID REFRIGERATING ELEMENTS

The present invention relates to apparatus for dispensing refrigerating elements, in particular plates and bags containing a substance formulated to accumulate negative calories, comprising a housing containing at least one storage unit for storing said refrigerating elements, refrigerated by a refrigerating device designed to load said refrigerating elements with negative calories, transfer means for transporting at least one refrigerating element stored and loaded with negative calories from the storage unit to at least one outlet provided in a wall in the housing and control means provided to activate said transfer means. The invention also relates to said refrigerating elements.

It is essential to keep frozen foodstuffs at the right temperature as micro-organisms may develop extremely quickly and cause a health hazard. Indeed, when it comes to sensitive products, such as minced beef, no presence, however tiny, of health-threatening micro-organisms or toxins must be detected. At −10° C., bacteria cease to multiply completely. There is no risk of finding morbific bacteria and toxins up to +3° C. At higher temperatures, the formidable salmonella (+5° C.) and golden staphylococcus (+6° C.) can proliferate dangerously. The risk can only be eliminated by making absolutely sure that the cold chain is not broken.

This is the reason why industrialists and distributors of frozen foodstuffs have improved the efficiency of their logistic circuits and have invested considerable amounts in refrigerating equipment. Numerous systems are currently used in order to provide indications concerning the temperature of the products whilst they are being transported and stored. For example, when transporting frozen foodstuffs, on-board automata continually record the temperatures in the truck and warn the driver in the event of an incident. In hypermarkets' linear facilities, thermomarkers, which change colour according to time-temperature variables, inform consumers about the quality and freshness of the products. Whilst everything is done to improve and maintain the cold chain from the producer to the distributor, there is little available to ensure that this chain between the distributor and the consumer is not broken. Indeed, there are isothermal bags so that the consumer can transport frozen foodstuffs home, but the temperature inside the bag is the same as the ambient temperature, particularly high in summer, and while transporting them, the bags are often placed in the car's boot where the temperature may also be relatively high. This is why these bags do not ensure that the cold chain is maintained nor are they efficient long enough throughout the time they are transported. It is therefore not possible to guarantee the ultimate quality of the frozen foodstuffs.

Some industrialists have attempted to solve the above-mentioned problems by proposing various types of apparatus for dispensing refrigerating elements with these elements being placed for example in an isothermal bag in order to ensure that the cold chain is not broken until the consumer arrives home. This apparatus is in particular described in the following publications FR-A-2 258 672, EP-A-0 140 153, DE-A-32 15 627 and DE-A-22 05 964. Nevertheless, in all of these devices, the refrigerating elements are stored piled one on top of the other, the refrigerating element lying at the bottom of the pile having to bear the weight of the others. It is easy to understand that this type of storage makes it difficult to take out the element which is at the bottom of the pile. Furthermore, the formation of frost tends to cause the elements to stick to one another, which further complicates the extraction of the elements. The elements are not guided during storage and may move and end up askew, thus jamming the apparatus. What is more, this type of storage system considerably limits the storage capacity in terms of the refrigerating elements for a reasonably compact device. The problems encountered with the elements sticking together and not being guided are worsened in the event of the elements being flexible as in some of the devices described with reference to the above-mentioned publications. Furthermore, these flexible elements can be perforated easily and no longer be able to be used.

The object of the present invention is to overcome the above-mentioned drawbacks by offering apparatus for dispensing refrigerating elements in which the elements are guided throughout the period they are stored. These elements are stored side by side and not one on top of the other, there is no danger of two elements sticking together due to the formation of frost, the storage capacity is quite significant for such a compact piece of apparatus, and the elements are rigid and can be used again and again without being damaged. Furthermore, this apparatus is of simple design, inexpensive, and requires very little servicing. This apparatus is very easy to use and is extremely versatile as it can be used not only to simply dispense and retrieve but also exchange refrigerating elements.

With this object in mind, the invention relates to a piece of apparatus for dispensing refrigerating elements of the type stated in the introduction, characterised in that said refrigerated storage unit comprises a helicoidal tube extending from the outlet so that the refrigerating elements move towards the outlet during storage.

The housing can also comprise transfer means to transport at least one refrigerating element to be recycled from at least one inlet provided in a wall in the housing and control means designed to activate said transfer means to transfer said refrigerating element to be recycled from said inlet to the refrigerated storage unit, the helicoidal tube extending substantially from the inlet to the outlet.

Advantageously, the helicoidal tube comprises, along its lower generating line, a plane guide rail so that the refrigerating elements are guided whilst moving in the refrigerated storage unit.

Before being placed in the refrigerated storage unit, the refrigerating elements to be recycled can be cleaned and sterilised by means of a cleaning device located on the route taken by the refrigerating elements to be recycled between the inlet and the storage unit. The cleaning device may be comprised of a sterilising agent injector and at least one brush designed to clean the refrigerating element to be recycled.

In a first form of embodiment of the invention, the transfer means used for transporting at least one refrigerating element stored and loaded with negative calories to the outlet and the transfer means used for transporting at least one refrigerating element to be recycled from the inlet make up the same device used for transferring the refrigerating elements and, the outlet and inlet constitute the same inlet/outlet for the refrigerating elements respectively to be recycled and loaded with negative calories so that by means of said transfer device, a refrigerating element loaded with negative calories is transferred from a lower zone in the refrigerated storage unit to the inlet/outlet whereas a refrigerating element to be recycled is transferred from the inlet/outlet to an upper zone in the refrigerated storage unit, the helicoidal tube extending from the upper zone to the lower zone so that the refrigerating elements move towards the base of the transfer device during storage.

In a particularly advantageous manner, the transfer device comprises a slide fitted with means of gripping the refrigerating elements and designed to move vertically along the wall of the housing in which the inlet/outlet is provided, and means of pushing the refrigerating elements to be recycled coming from the slide in the refrigerated storage unit. Said means of gripping the refrigerating elements may include first means of gripping the refrigerating elements loaded with negative calories, provided substantially in the lower part of the slide and second means of gripping the refrigerating elements to be recycled, provided substantially in the upper part of the slide and said means of pushing the refrigerating elements to be recycled are provided so that they correspond to the second zone, so that the second gripping means receive said refrigerating element to be recycled via the inlet/outlet whilst said first gripping means take up said refrigerating element loaded with negative calories in the refrigerated storage unit and so that the pushing means place said refrigerating element to be recycled in the refrigerated storage unit whilst said first gripping means bring said refrigerating element loaded with negative calories into the inlet/outlet.

In this form of embodiment, the first gripping means may comprise gripping clamps with two articulated branches, designed to grip the refrigerating element loaded with negative calories on its sides, the ends of such branches comprising gripping jaws. The second gripping means may comprise a window provided in the slide, the shape of which matches the refrigerating element. The pushing means may have a swing designed to push the refrigerating element to be recycled on to the helicoidal tube.

In a particularly advantageous manner, the slide, the pushing means and the cleaning device are activated by the same mechanism. The latter may comprise at least one rack extending along said slide whilst the pushing means and the cleaning device may comprise respectively at least one driving pinion designed to cooperate with said rack.

In a second form of embodiment, the transfer means are distinct, the inlet and outlet are distinct, the inlet being provided close to the upper zone in the storage unit and the outlet being close to the lower zone in the storage unit, and the helicoidal tube extends from said upper zone to said lower zone so that the refrigerating elements move towards the lower zone during storage.

In this embodiment, the transfer means may comprise a ram designed to push a refrigerating element loaded with negative calories from the storage unit towards the outlet, this refrigerating element having left the helicoidal tube and resting against a guide wall to face said outlet.

Likewise, the transfer means may comprise at least two brushes, belonging to the cleaning device, these brushes being cylindrical and parallel, rotating and designed to move said refrigerating element to be recycled between them from the inlet to the storage unit and at least one rubbing element arranged parallel to the direction of movement of said refrigerating element and against the latter to slow it down, with the aim of creating a differential speed between it and the brushes so that they can clean said refrigerating element properly.

In an advantageous manner, the dispenser comprises a detector placed behind the inlet designed to detect the presence of a refrigerating element to be recycled, this detector being connected to the means of controlling the transfer means. In particular, it comprises two lateral detectors and an upper or lower detector designed to recognise the shapes of the refrigerating element.

To ensure the tightness of the refrigerated storage unit's inlet and outlet, the dispenser according to the invention comprises tight doors made up for example of flat brushes and thin rubber strips.

In order to either sell a refrigerating element loaded with negative calories or dispense a refrigerating element loaded with negative calories in exchange for a refrigerating element to be recycled, the refrigerating element dispenser may comprise at least one slot paying mechanism connected to the control means.

The invention also relates to a refrigerating element containing a substance formulated to accumulate negative calories, designed to be used in a dispenser according to the present invention, characterised in that it is presented in the form of a substantially rectangular plate and in that it comprises a flared crossing orifice opening out onto its front and rear sides, with a substantially circular radial cross-sectional area with a diameter which is substantially greater than that of the helicoidal tube so that the lower rear end of the crossing orifice is not in contact with said tube and the upper rear end of the orifice is tangent to said helicoidal tube, this point of contact constituting the point at which the refrigerating element is supported on the helicoidal tube.

The refrigerating element may comprise a slot allowing said crossing orifice to communicate with the outside of the refrigerating element, the form of said slot matching that of the guide rail provided on the helicoidal tube. It may also comprise notches on its sides for it to be gripped by the transfer means.

In order to improve its movement inside the refrigerated storage unit, the refrigerating element is also designed so that its centre of gravity lies below said supporting point and so that it is axially offset in relation to said supporting point in its direction of movement on the helicoidal tube. This can be achieved due to the fact that the refrigerating element has a relief angle located below said supporting point, said angle being formed by the angle of inclination of the rear face of the refrigerating element under the crossing orifice.

In order to remain loaded as long as possible with negative calories, the substance which the refrigerating elements contains is made up of a eutectic liquid.

The present invention and its advantages shall be disclosed in more detail in the following description of two examples of embodiment with reference to the attached drawings in which.

Figure 3:
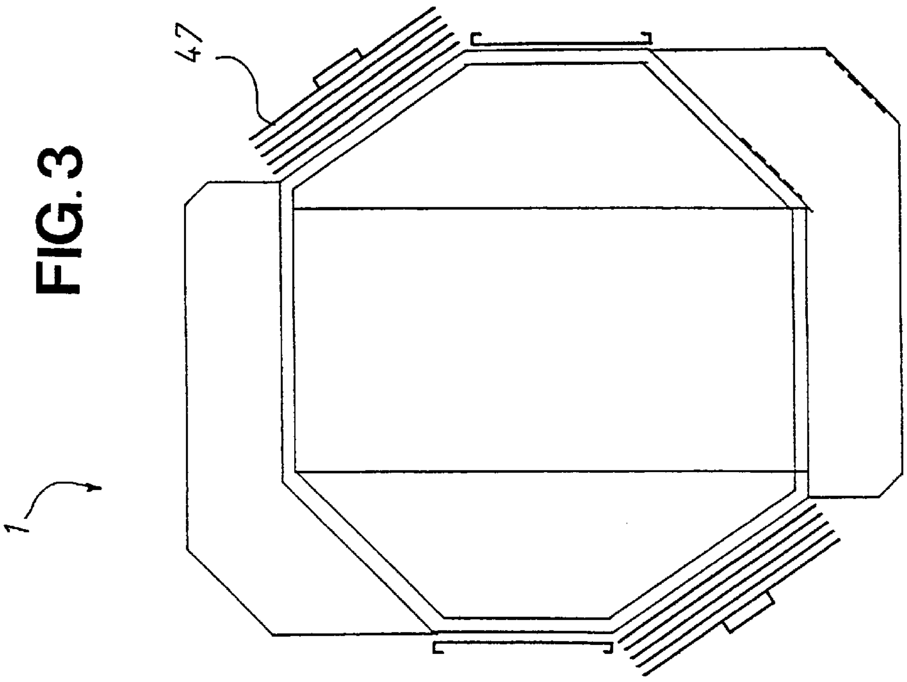
FIG. 3 is a top view of the apparatus for dispensing refrigerating elements according to the invention.
Figure 1:
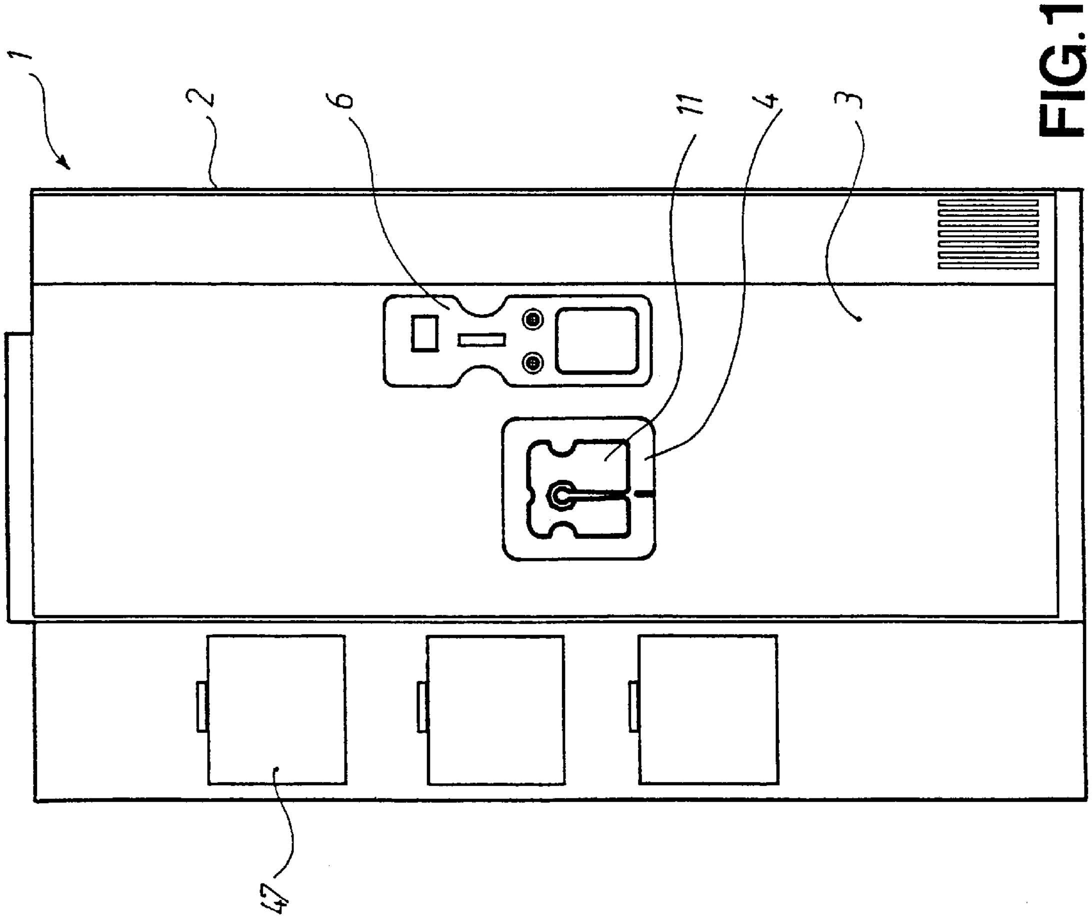
FIG. 1 represents a front view of the apparatus for dispensing refrigerating elements according to the present invention.
Figure 2:
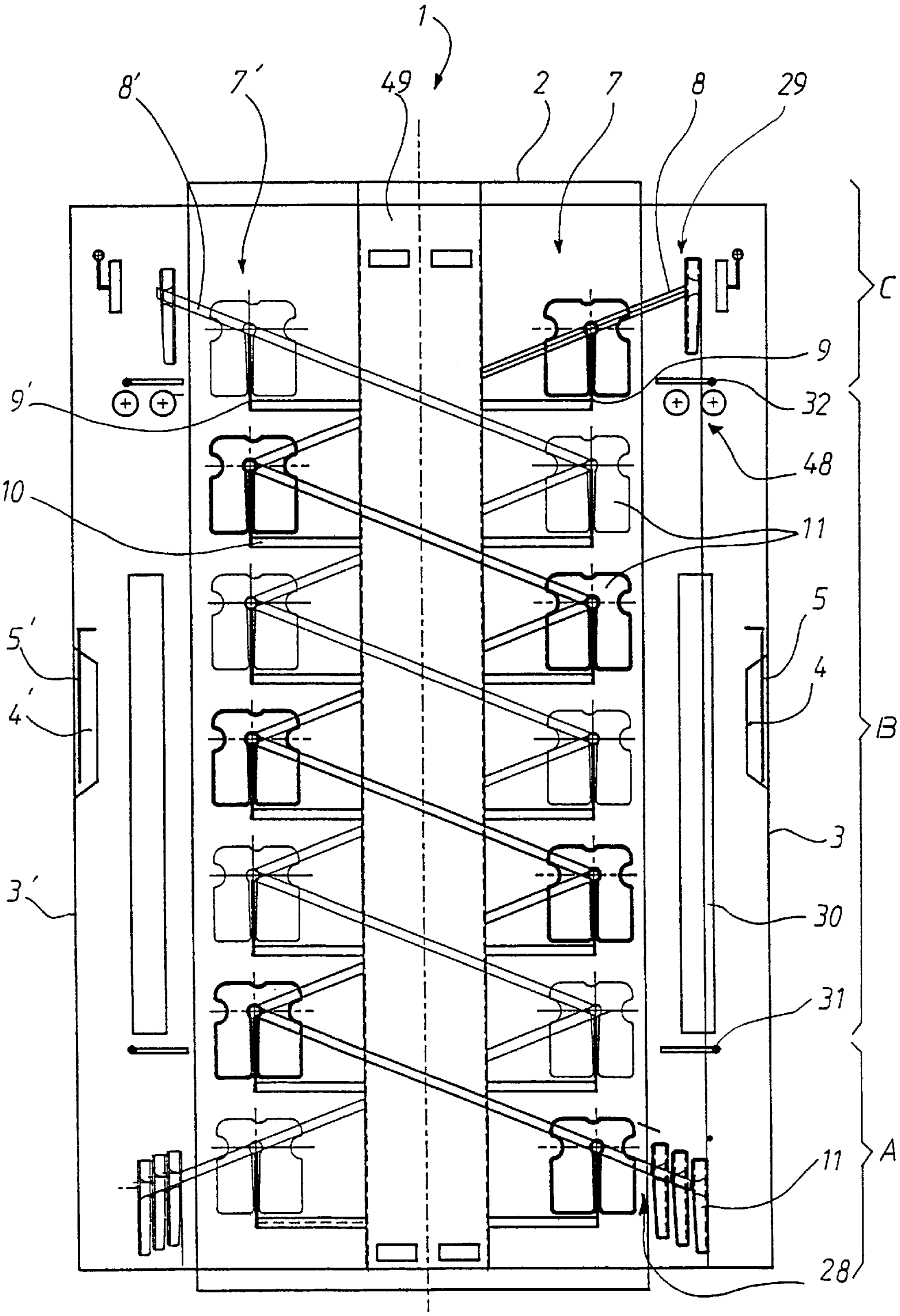
FIG. 2 represents a cutaway side view of the apparatus for dispensing refrigerating elements with two storage units.

With reference to FIGS. 1 to 3, the dispenser 1, which is substantially octagonal shaped, comprises a housing 2 two walls of which 3 and 3' each present an inlet/outlet 4 and 4' sealed by a safety flap 5 and 5'. The latter are transparent, mounted on slide rails (not shown) and fitted with return springs. A conventional slot paying mechanism 6, 6', connected to an electronic control unit (not shown), is installed on the same wall 3, 3'.

Figure 6:
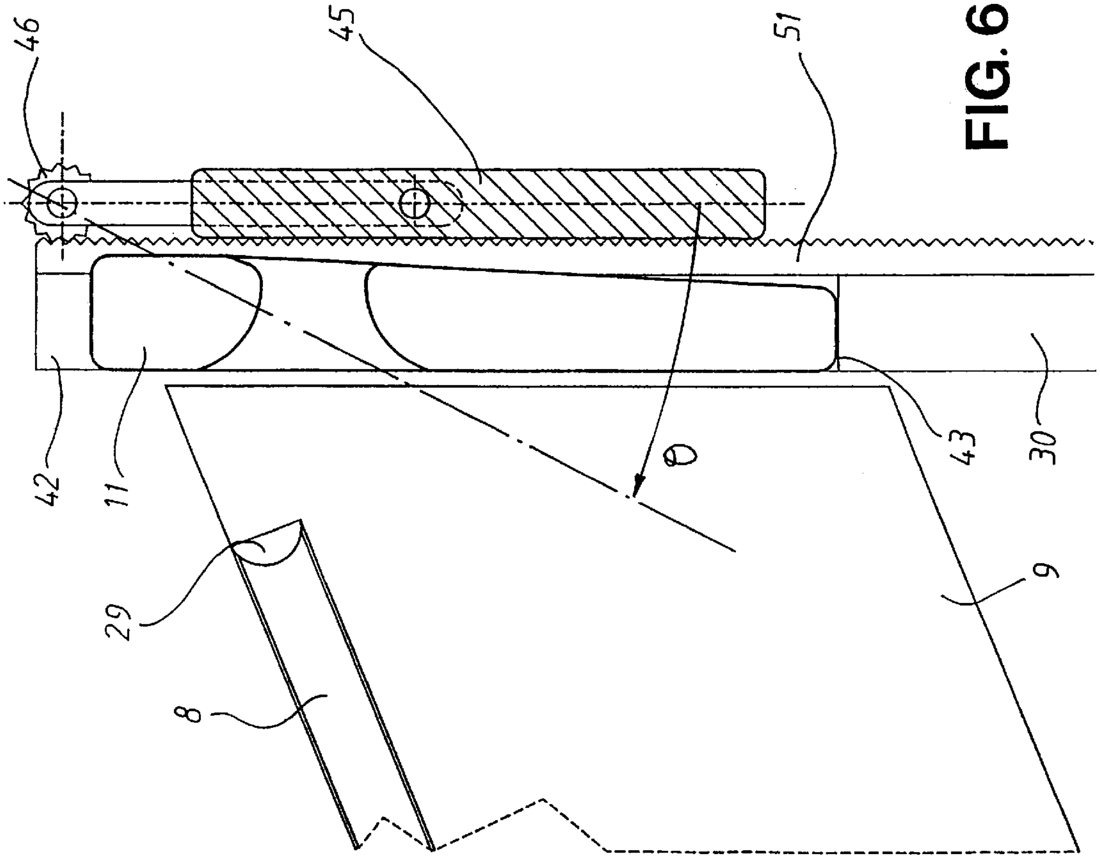
FIG. 6 shows details of the gripping means and the means of pushing the refrigerating elements to be recycled.

With reference in particular to FIG. 2, the housing 2 contains a central tube 49 allowing air to circulate in a forced air circuit, two storage units 7 and 7' refrigerated by a refrigerating device (not shown) conventionally comprising a compressor, an evaporator, a condenser and a condensates pan. Foam is injected or foam plates are laid between both the refrigerated storage units 7, 7' and the walls of the housing 2 so as to insulate said refrigerated storage units from the outside. Each refrigerated storage unit 7, 7' comprises a helicoidal tube 8, 8' with a constant pitch extending from top to bottom. The threads which make up said helicoidal tube 8, 8', form an angle of between 18° and 25° approximately with the horizontal line. A plane shaped guide rail 9, 9' is provided over the whole length of the helicoidal tube's 8, 8' lower generating line. As FIG. 6 shows in greater detail, the guide rail 9, 9' is extended a few centimeters beyond the upper end 29 of the helicoidal tube 8, 8'. The two refrigerated storage units 7 and 7' are arranged in the housing 2 so that the two helicoidal tubes 8 and 8' and the guide rails 9, 9' form two parallel helixes with the same pitch offset in relation to one another at a distance equal to half the pitch. To support the helicoidal tubes 8 and 8', a supporting tube 10 is fixed on the inside faces of the guide rails 9 and 9', every 45 degrees. Other fastening means may be envisaged. The helicoidal tubes 8 and 8' and the guide rails 9 and 9' are made of a metal material. A defrosting system (not shown) may be installed inside the tubes 8 and 8' to prevent frost from forming.

It will be obvious to the expert that the housing 2 can contain only one refrigerated storage unit 7 and in this case one single inlet/outlet 4, one single safety flap 5 and one single slot paying mechanism 6. As the dispenser with two refrigerated storage units is symmetrical in relation to its central axis, it shall only be described from hereon with one single refrigerated storage unit 7.

Figure 7:
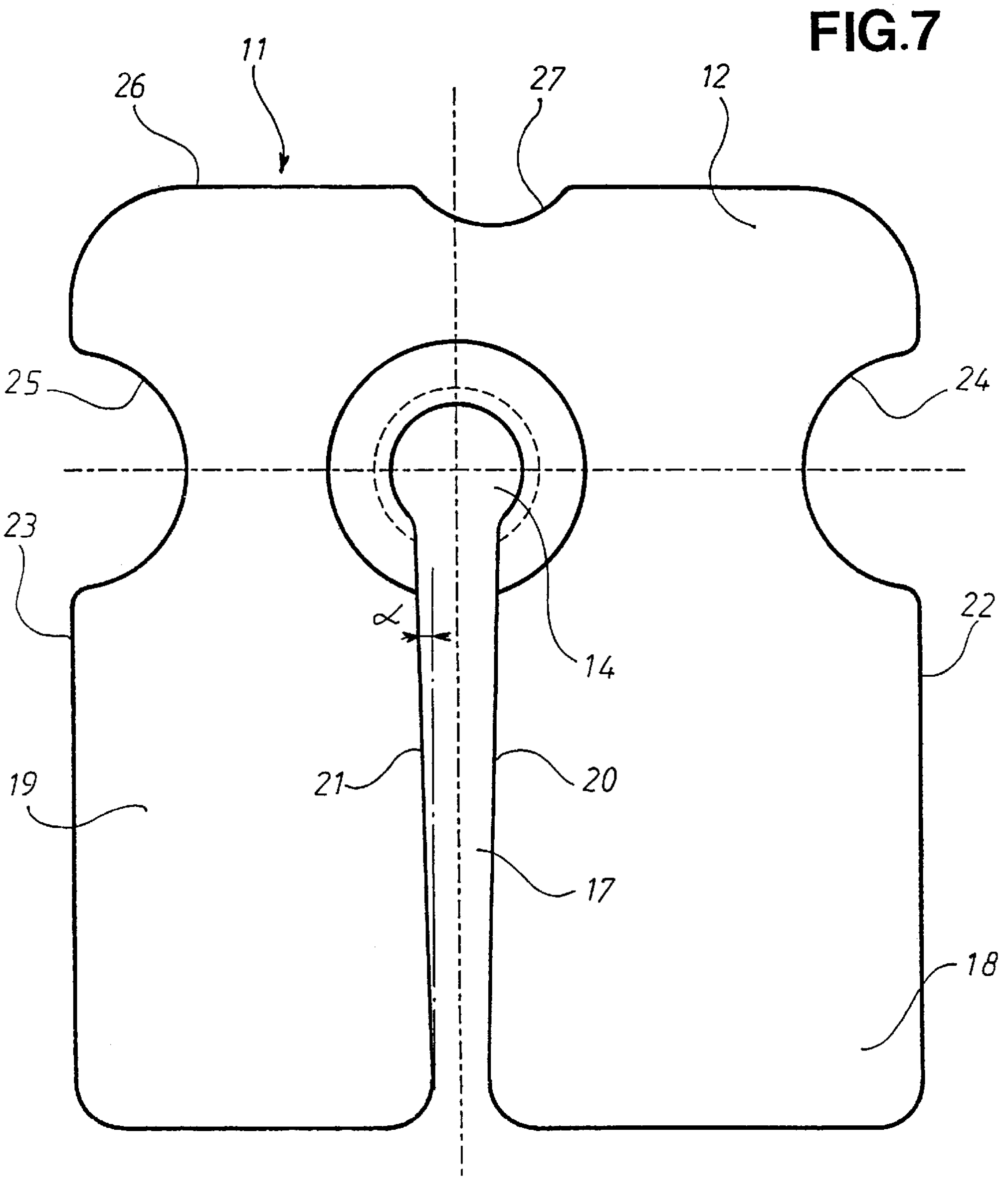
FIG. 7 represents a front view of the refrigerating element according to the invention.
Figure 8:
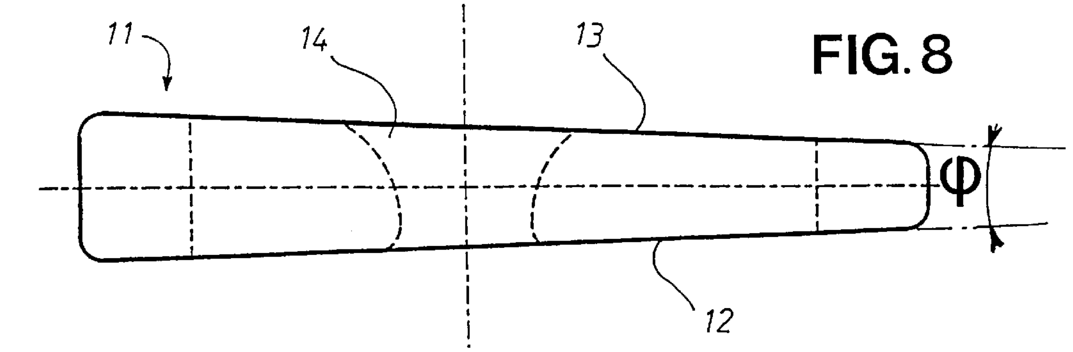
FIG. 8 represents a top view of the refrigerating element according to the invention.
Figure 9:
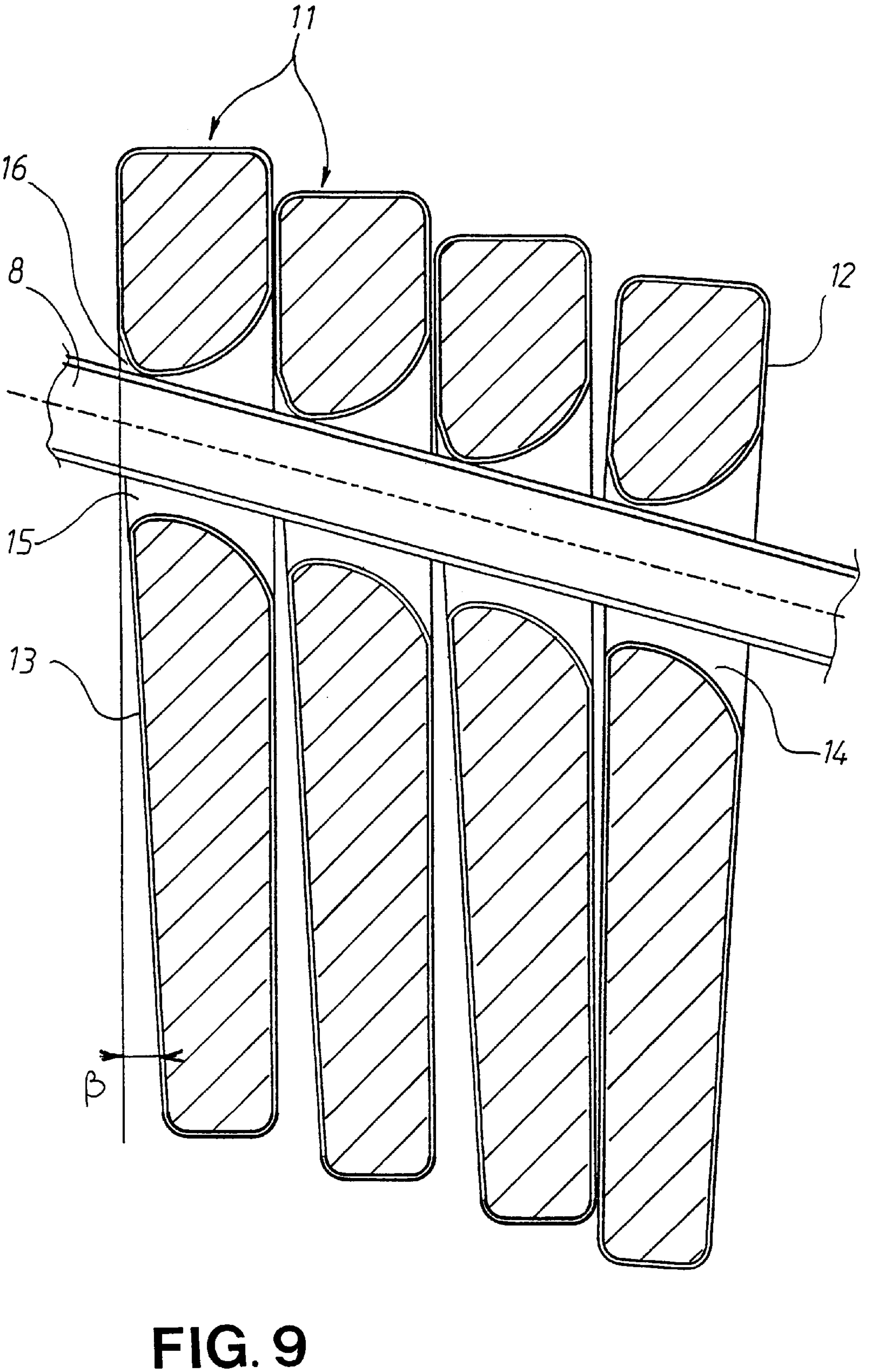
FIG. 9 represents a cutaway view of several refrigerating elements on the helicoidal tube.
Figure 10:
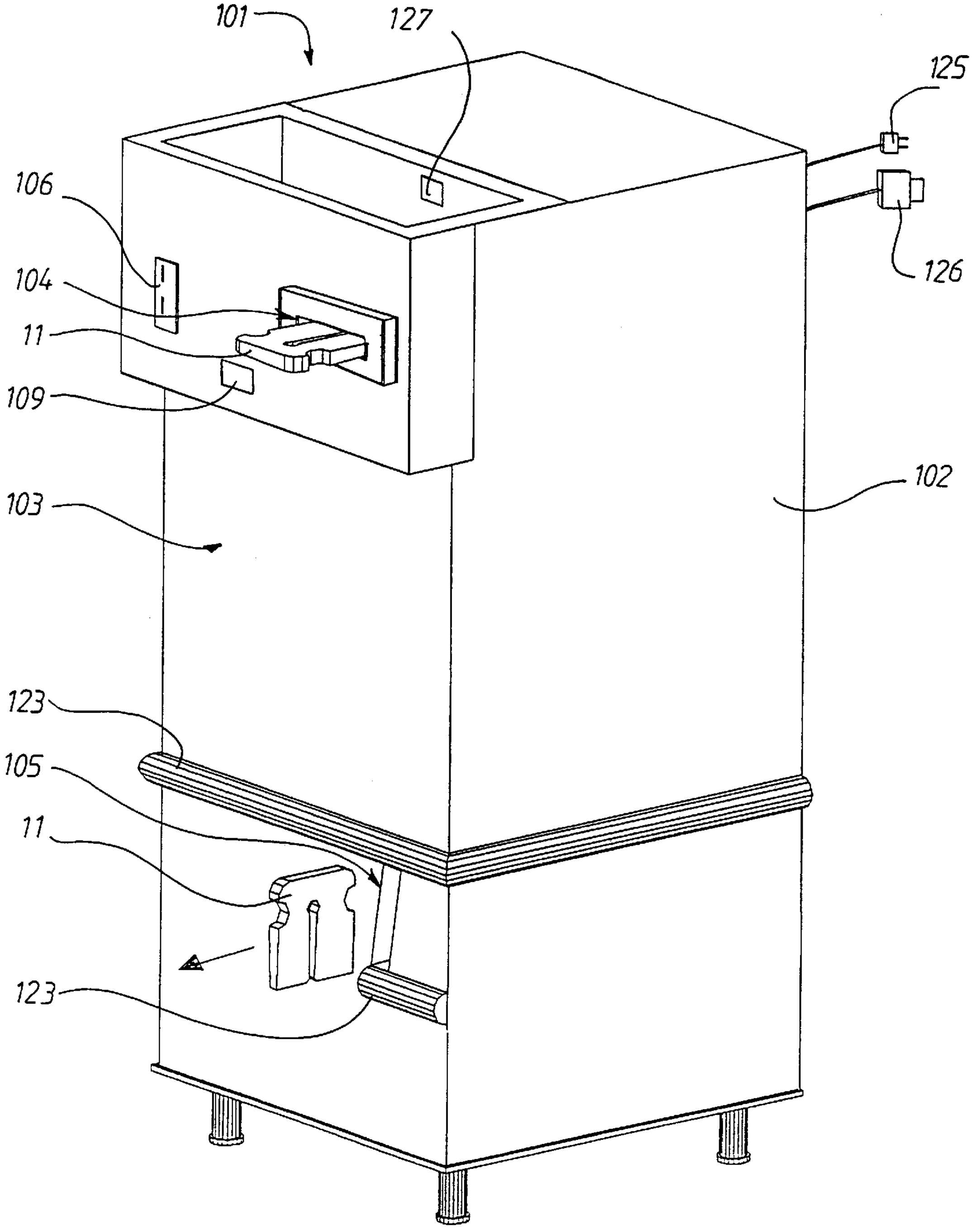
FIG. 10 is an overall view of an alternative embodiment of the apparatus for dispensing refrigerating elements according to the invention.

Said refrigerated storage unit 7 contains a plurality of refrigerating elements 11 positioned one behind the other on the helicoidal tube 8. With reference to FIGS. 7 to 9, the refrigerating element is presented in the form of a substantially parallelpipedic plate with rounded angles. The side faces 22, 23 and upper face 26 of the refrigerating element 11 present notches 24, 25 and 27 of a substantially semi-cylindrical shape. The notches 24 and 25 are provided to facilitate the gripping of the refrigerating element 11. The notch 27 is provided for the purpose of filling the refrigerating element 11 with the substance formulated to accumulate negative calories.

On its front and rear faces 12 and 13, the refrigerating element 11 presents a flared crossing orifice 14 with a substantially hyperbolic axial section and a substantially circular radial section with a diameter substantially greater than that of the helicoidal tube 8 so that, as can be seen in FIG. 9, the lower rear end 15 of the crossing orifice 14 is not in contact with said tube 8 and the upper rear end 16 of the orifice 14 is tangent to said helicoidal tube 8, this point of contact 16 being the only point where the refrigerating element 11 is supported on the helicoidal tube 8. The crossing orifice 14 is extended downwards by a slot 17 so that the refrigerating element 11 presents two lugs 18 and 19 below the crossing orifice 14 and on either side of the slot 17. The slot 17, the width of which is substantially greater than the thickness of the guide rail 9, narrows towards the bottom so that the lateral facing edges 20 and 21 of the lugs 18 and 19 are inclined at an angle $\alpha$ in relation to the vertical line. The front face 12 of the refrigerating element 11 is plane whereas the rear face 13 presents a relief angle $\beta$ from the supporting point 16 in the part of the refrigerating element 1 which is below the crossing orifice 14. This structural shape means that the refrigerating element's centre of gravity is below the supporting point 16 and it is axially offset in relation to said supporting point 16 in the direction of movement of this element on the helicoidal tube 8.

The front and rear faces 12 and 13 form an angle $\phi$, which makes the thickness of the refrigerating element 11 vary, the thickest part being on the outside when the refrigerating elements 11 are placed on the helicoidal tube 8. They thus rest one on top of the other over the whole area of the faces 12 and 13 above the crossing orifice 14 when they move on said helicoidal tube 8. Due to this structural shape, the crossing orifice 14 and the slot 17 are off-centre on the thickest part of the refrigerating element 11 so as to balance the distribution of the substance contained in the refrigerating element 11 between the lugs 18 and 19. Said substance is a eutectic mixture, the melting point of which is for example equal to −16° C.

With reference again to FIG. 2, the helicoidal tube 8 comprises a lower end or lower zone 28 which extends toward a first zone called "gripping station" A for the refrigerating elements 11 loaded with negative calories, said zone being situated behind the wall 3 in which is provided the inlet/outlet 4. The length of the helicoidal tube 8 is such that the last refrigerating element 11 loaded with negative calories is no longer carried by said helicoidal tube 8 but is simply kept between the wall of the gripping station A and the second last refrigerating element 11 loaded with negative calories. An insulating material is placed around the gripping station A in order to insulate it from the outside. Above said gripping station A there is a transfer zone B, separated from the gripping station A by a flap 31 fitted with a return system (not shown). The transfer zone B communicates with the outside via the inlet/outlet 4 in the wall 3 of the housing 2. It is therefore at ambient temperature.

In the transfer zone B a slide 30 is provided which can move vertically along the wall 3 of the gripping station A toward a second zone called "pushing station" C for the refrigerating elements to be recycled, the pushing station being located above the transfer zone B.

Figure 4:
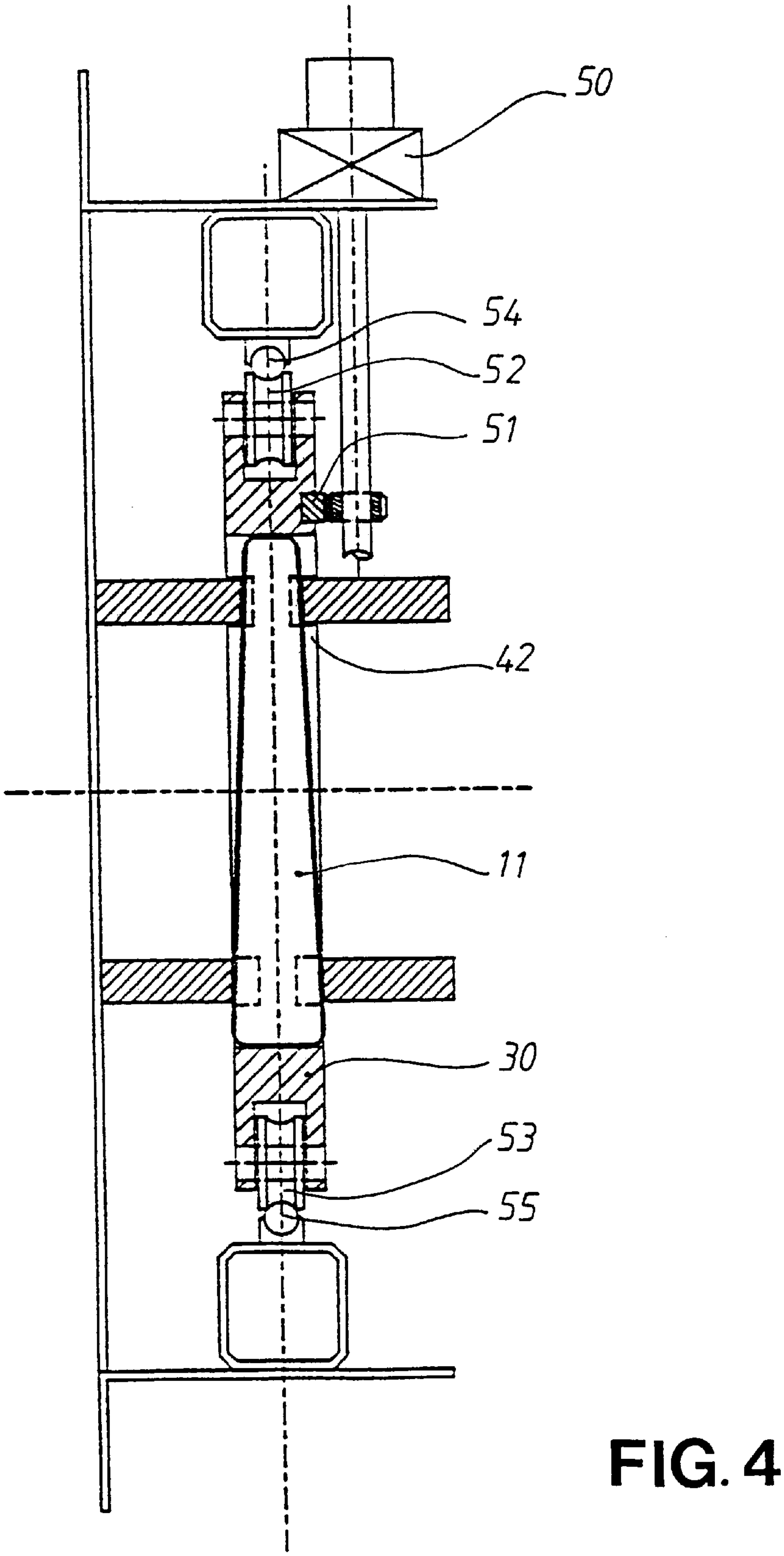
FIG. 4 is a top view of the slide and its control mechanism.

With reference to FIG. 4, the slide is activated by an electric motor 50 and a rack-and-pinion transmission, the rack 51 being provided on the back of said slide 30. The latter is guided in translation by two vertical guides 54 and 55 provided on the housing 2 by means of rollers 52 and 53.

Figure 5:
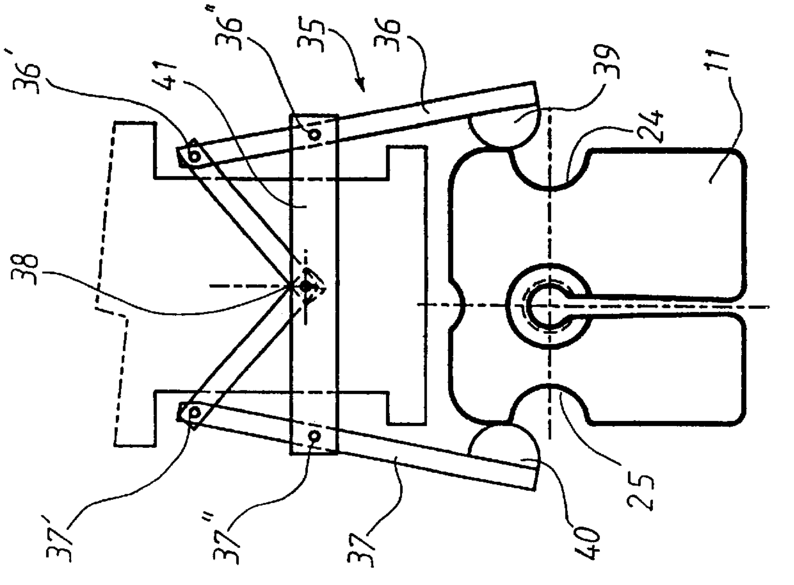
FIG. 5 shows details of the means of gripping the refrigerating elements loaded with negative calories.

The lower part of the slide 30 is extended by an M-shaped squeezing device 35, shown in FIG. 5. Said squeezing device 35 is fixed on the slide by a pivot 38 at the "point" of the M and comprises two branches 36 and 37 articulated by two pivots 36' and 37'. The ends of the branches 36 and 37 have two jaws 39 and 40 on them, the shape of which matches the notches 24 and 25 of the refrigerating element 11. The two branches 36, 37 are connected by a transversal bar 41 in relation to which they can pivot freely due to the two pivots 36" and 37". The transversal bar 41 is used to keep substantially the same distance between the two branches 36, 37, this distance being substantially greater than the width of the refrigerating element 11.

As FIG. 6 shows in more detail, the upper end of the slide 30 presents a window 42 cut out so that its shape matches that of the refrigerating element 1. The lower sill 43 of the window 42 comprises a vertical plate 44 the shape of which matches the slot 17 of the refrigerating element 11. This plate 44 constitutes an orientating device in order to properly place the refrigerating element to be recycled. This orientating device can also be provided in the inlet/outlet 4.

In the upper part of the transfer zone B there is a device 48 for cleaning the refrigerating elements 11 to be recycled. It is made up of a sterilising agent injector, two brushes and two scrapers placed on either side of the window 42. The injector is fed by a fluid reservoir (not shown) containing a sterilising agent with an added cleaning agent and antifoaming agents in an aqueous environment. Downstream there is a diaphragm pump with a nonreturn valve, a solenoid valve controlled by a control unit (not shown). The fluid reservoir is therefore not under pressure. The brushes are activated by pinions engaged in another pinion in direct attack with the same rack 51 which activates the slide 30.

The pushing station C is insulated from the outside by an insulating material and separated from the transfer zone B by a flap 32 fitted with a return system (not shown). It comprises a swing 45, fixed on a toothed wheel 46 in direct attack with the same rack 51 which activates the slide 30. The width of the swing 45 is substantially smaller than that of the window 42 in the slide 30. It is positioned in the pushing station C so as to be substantially at the same height as the guide rail 9 extending the upper end or upper zone 29 of the helicoidal tube 8.

The length of the slide 30 is such that the squeezing device 35 is opposite the inlet/outlet 4 when the window 42 is opposite the swing 45 and such that the window 42 is opposite the inlet/outlet 4 when the squeezing device 35 is opposite the lower end 28 of the helicoidal tube 8.

The apparatus 1 for dispensing refrigerating elements 11 is particularly easy to operate and use. Indeed, the dispenser 1 is placed, for example, close to the frozen food shelves in a hypermarket. Depending on the space available or the location chosen, the dispenser I can be used with a single or double distribution side and the have one or two refrigerated storage units 7. Before being put into service, the refrigerated storage unit 7 is filled with refrigerating elements 11 loaded with negative calories which can be stored beforehand on pallets in freezers. Using an access door (not shown), the hypermarket staff can place the refrigerating elements 11 loaded with negative calories on the helicoidal tube(s) 8, 8'.

When the consumer purchases frozen foodstuffs, he often already has an isothermal bag. If he doesn't, he can obtain an isothermal bag 47 which is presented on one of the walls of the dispenser 1. In order for the inside of the isothermal bag to remain cold long enough so as not to break the cold chain, the customer can buy or obtain a refrigerating element loaded with negative calories. In order to do so, he inserts a coin or a token, given for example by a manufacturer, into the slot paying mechanism 6. The customer presses the control button which is used to select the sale of refrigerating elements 11 loaded with negative calories with no exchange, using an electronic control device (not shown). Up until then, the slide 30 was in the idle position, i.e. it was substantially in the centre of the transfer zone B. Once the control unit activates the motor 50 and the rack 51, the slide moves down into the gripping station A pushing the flap 31 to open it. In the gripping station A, at the end of the helicoidal tube 8, there is a refrigerating element 11 loaded with negative calories. When the jaws 39 and 40 of the articulated branches 36 and 37 of the squeezing device 35 come into contact with the upper edges of the refrigerating element 11 loaded with negative calories, the former separate and pivot slightly due to the various pivots 36', 37', 36", 37" and 38 to co-operate with the notches 24 and 25 of the refrigerating element 11 loaded with negative calories. The jaws 39 and 40 then hold the refrigerating element 11 loaded with negative calories in the squeezing device 35 without holding it tight. A limit switch (not shown) is used to determine the end of the slide's downward movement. The slide 30 then moves back up to the transfer zone, the refrigerating element loaded with negative calories being held by the squeezing device 35. The flap 31 closes again due to its return system once the side 30 has left the gripping station A. In the transfer zone B, the slide 30 rises sufficiently so that the squeezing device 35 is level with the inlet/outlet 4. A limit switch (not shown) allows the slide 30 to stop in the right position. The client then opens the safety flap 5 and takes out the refrigerating element 11 loaded with negative calories in the inlet/outlet, e.g. through the crossing orifice 14 and places it in his isothermal bag. Once the safety flap 5 has closed again, the slide 30 returns to its idle position again.

In the event of the client bringing back a refrigerating element to be recycled and wishing to exchange it for a refrigerating element loaded with negative calories, he presses the control button to select the exchange of refrigerating elements. Depending on the shop's sales policy, the exchange may be free or not and the control unit is then programmed accordingly. Up until then, the slide 30 was in the idle position. Once the control unit activates the motor 50 and the rack 51, the slide moves down toward the gripping station A and in this zone, the squeezing device 35 operates in the same way as was described previously for the sale of an refrigerating element with no exchange made. When the slide 30 arrives at its limit of downward travel, the squeezing device 35 finds itself facing the lower end 28 of the helicoidal tube 8 and grips the refrigerating element 11 loaded with negative calories. In this position, the window 42 is facing the inlet/outlet 4. The customer manually opens the safety flap 5. Two limit switches (not shown) make it possible to stop the apparatus from operating in any way as soon as the safety flap is lifted. The customer can then insert his refrigerating element to be recycled through said inlet/outlet 4 into said window 42. Gripping the refrigerating element 11 is facilitated by the notches 24 and 25. Due to the orientating device made up of the plate 44 on the lower sill 43 of the window 42, the customer can only insert his refrigerating element to be recycled in one direction. The safety flap 5 closes under the under the action of its return spring as soon as the customer has let it go once the refrigerating element to be recycled is in place. The slide 30 then moves back up toward the upper part of the transfer zone B so that the refrigerating element 11 to be recycled can pass through the cleaning device 48. Using the injector, the sterilising agent is sprayed onto the refrigerating element to be recycled which is then cleaned by means of the brushes and dried by the scrapers. The slide continues to move upwards while the refrigerating element to be recycled is being cleaned and reaches the pushing station C after having opened the flap 32 by just pushing it. A limit switch (not shown) allows the slide 30 to stop in the position shown in FIG. 6 so that the refrigerating element 11 to be recycled finds itself facing the upper end 29 of the guide rail 9 and the window 42 is substantially level with the swing 45. At the same time as the slide arrives at its limit of travel, the rack engages with the toothed wheel 46 on which the swing 45 is firmly mounted so that said swing pivots at an angle θ in the direction of the refrigerating element 11 to be recycled. The swing 45 then pushes the refrigerating element 11 to be recycled so that the latter fits onto the guide rail 9 and then onto the helicoidal tube 8. Fitting the refrigerating element 11 to be recycled onto the helicoidal tube 8 is in particular facilitated by the flared shaped of the crossing orifice 14. At the same time, the squeezing device 35 holding the refrigerating element 11 loaded with negative calories finds itself facing the inlet/outlet 4. The customer opens the safety flap 5 to be able to take out said refrigerating element loaded with negative calories. As soon as the customer has let the safety flap go, the latter closes under the action of its return spring. The slide then moves back down into the transfer zone B, the flap 32 closing again due to its return system and the slide returns to its idle position to await another request.

To ensure that the apparatus I for dispensing refrigerating elements 11 operates properly, it is necessary to always have a refrigerating element loaded with negative calories accessible in the gripping station A. This is achieved by the fact that the refrigerating elements to be recycled are reinserted into the refrigerated storage unit 7 and descend along the helicoidal tube 8 toward the gripping station A whilst being loaded with negative calories. The refrigerating elements 11 progress easily on the helicoidal tube 8 due to their special shape. Indeed, the single point 16 at which the refrigerating element 11 is supported on the helicoidal tube 8 and the lower and offset position of the refrigerating element's 11 centre of gravity in relation to the supporting point create a torque so that the refrigerating element moves naturally along the inclined helicoidal tube 8. The movement is facilitated by the fact that the refrigerating elements 11 in the upper part of the refrigerated storage unit 7 push the refrigerating elements 11 in the lower part of the refrigerated storage unit 7. If the speed of the refrigerating elements during their descent on the helicoidal tube 8 becomes too high and the refrigerating elements move out of centre due to the centrifugal force, the lugs 18 or 19 rubbing on the guide rail 9 makes it possible to naturally slow down the refrigerating elements 11.

Furthermore, if the speed at which the refrigerating elements are sold is greater than the speed at which they are cooled and in order to avoid running out of refrigerating elements loaded with negative calories, provision is made for the apparatus to have a counter making it possible to manage the incoming and outgoing refrigerating elements and indicate the fall in stock from a predefined alarm threshold. When it is full, the apparatus for dispensing refrigerating elements according to the invention makes it possible to store 415 refrigerating elements per refrigerated storage unit.

One alternative embodiment is now described with reference to FIGS. 10 to 13. The distribution unit 101 distinguishes itself from the apparatus 1 described above by the presence of two distinct orifices, one inlet and one outlet, and by the removal of the transfer slide 30 and its drive system. These differences make it possible to further simplify the device 101, resulting in reduced cost, space requirement and servicing. This device 101, which is substantially square shaped, comprises a housing 102, one of the walls 103 of which has an inlet 104 in the upper part and an outlet 105 in the lower part. A conventional slot paying mechanism 106 is located in the same wall 103 located substantially level with the inlet and connected to an electronic control and management unit 109 provided inside the device in the upper part. Of course, the layout of these various elements can be changed.

Figure 11:
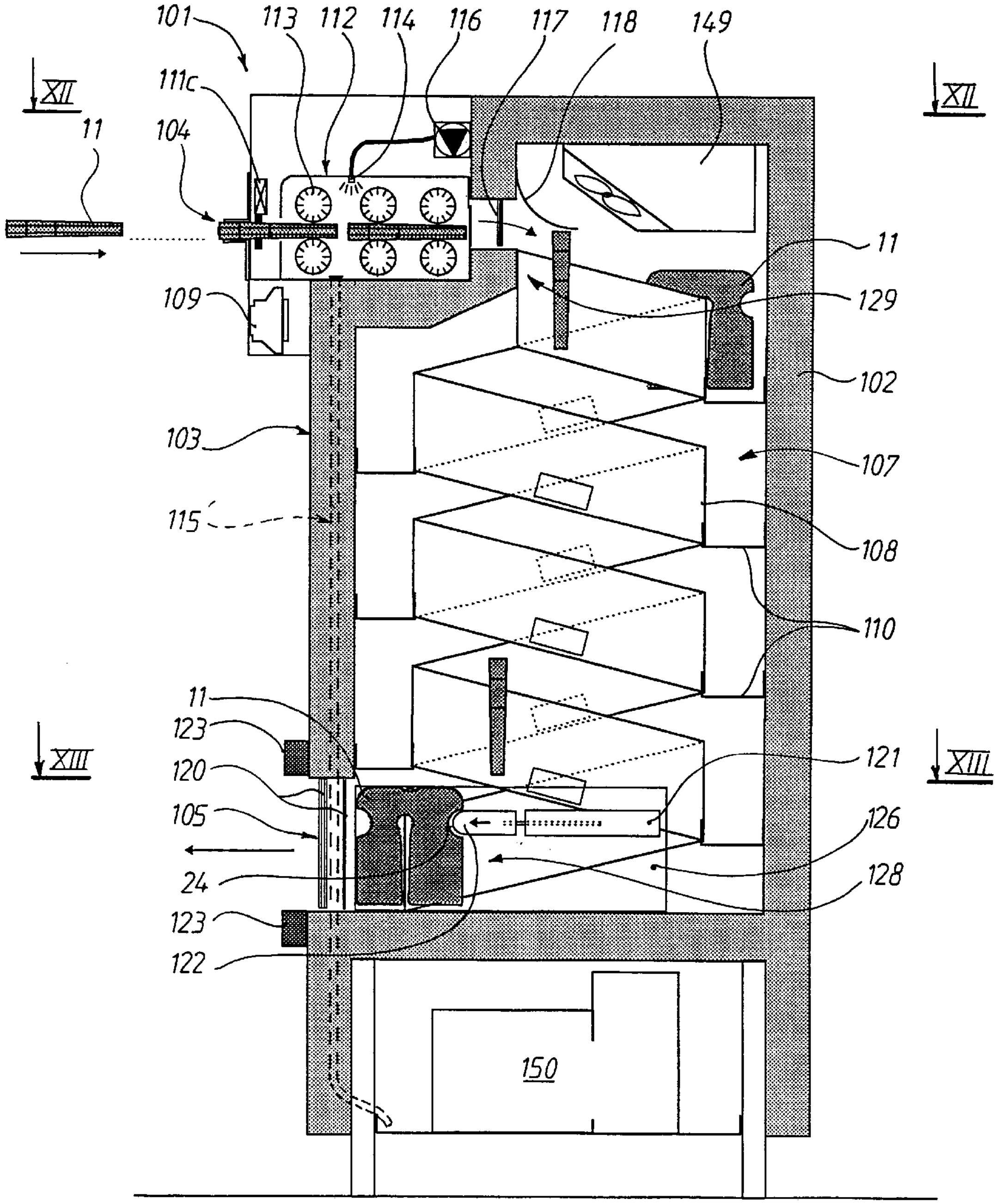
FIG. 11 is a plan view of the inside of the apparatus in FIG. 10.
Figure 12:
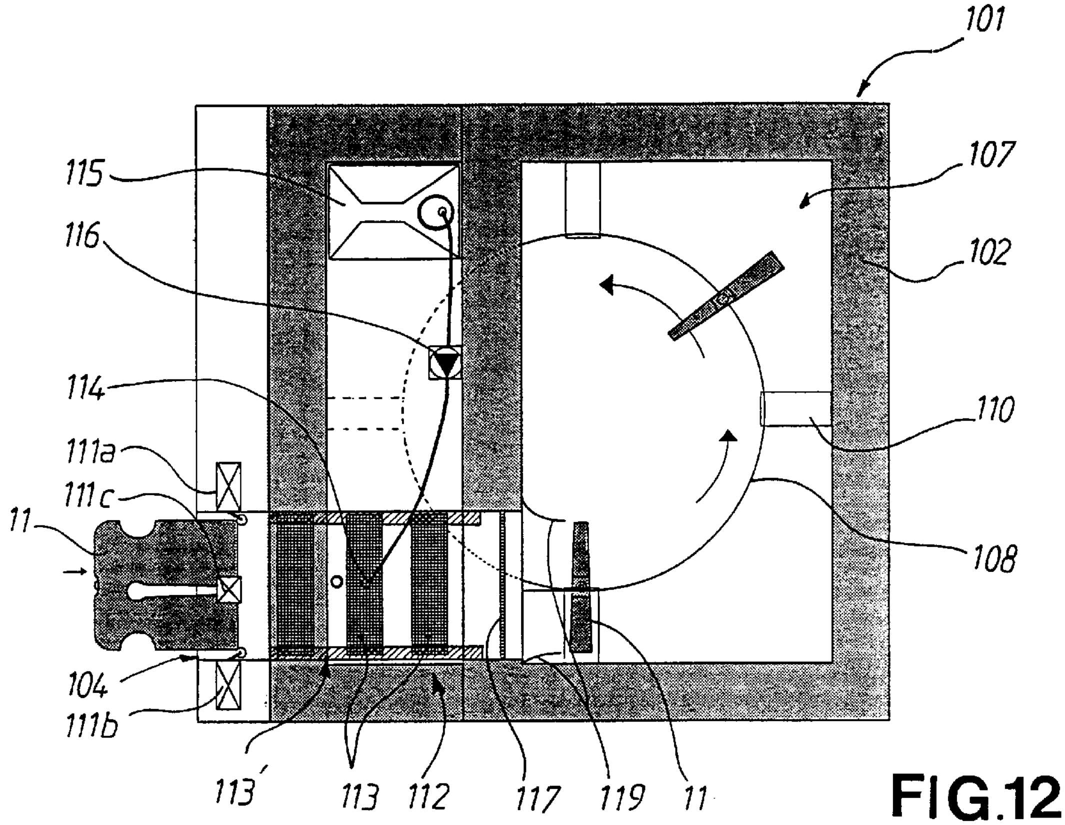
FIG. 12 is a cross section along the XII—XII axis of the apparatus in FIG. 11 and, FIG. 13 is a cross section along the XIII—XIII axis of the apparatus in FIG. 11.
Figure 13:
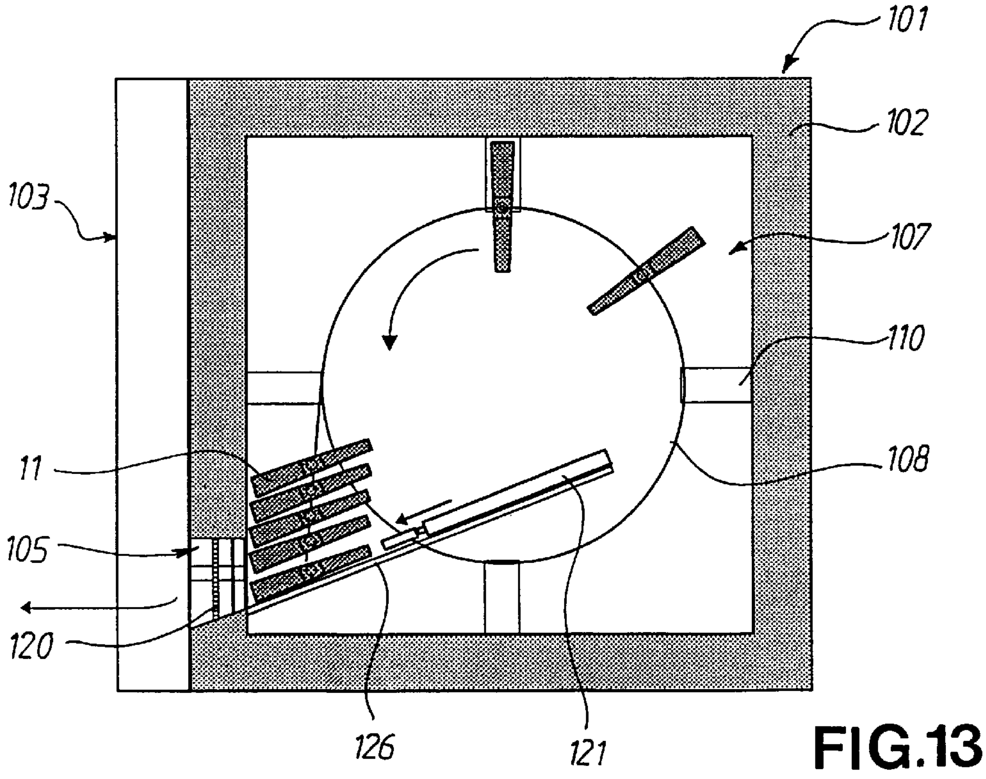

With reference in particular to FIG. 11, the housing 102 contains an evaporation and ventilation device 149, a storage unit 107 refrigerated by a conventional refrigerating device 150 provided underneath the apparatus 101. The storage unit 107 is insulated from the walls of the housing 102 by an injected foam or plates of foam and comprises a helicoidal storage and guide rail 108, with a plane section, replacing the previous storage tube 8 and the guide rail 9 but which offer the same functions. Its design allows the diameter and pitch of the helix to be reduced thus making it possible to increase the capacity for storing the refrigerating elements 11 whilst reducing the space required. The threads which make up this rail 108 make an angle lying between 8° and 15° approximately with the horizontal line. This helicoidal rail 108 extends from one end or upper zone 129 located substantially at the same height as the inlet 104 to one end or lower zone 128 located substantially at the same height as the outlet 105. This helicoidal rail 108 is fixed to the inside walls of the storage unit 107, or could be fixed to a central supporting tube (not shown), by means of U-shaped stirrups 110 spread out a regular intervals along said rail, e.g. every 90°. As previously, the helicoidal rail 108 is designed to receive a plurality of refrigerating elements 11 which are identical to those described above.

The inlet 104 is substantially orientated horizontally and its shape matches that of a refrigerating element 11 to be recycled presented lying in the direction of the orifice 104. The slightly conical shape of the inlet 104 makes it possible to orientate the refrigerating element 11 to be recycled properly. This refrigerating element 11 can be inserted both by its lugs 18, 19 and by its upper face 26. Three limit switches or recognition cells 111*a*, 111*b*, 111*c* are provided directly behind the inlet 104, two of which are lateral detectors 111*a* and 111*b* and one of which is an upper or lower detector 1111*c* so that they are placed above the slot 17 of the refrigerating element 11. They make it possible to detect the presence of a refrigerating element 11 to be recycled and above all to recognise it to avoid any risk of fraud, and then inform the control and management unit. They generate electric binary signals 1 or 0 depending on whether they detect a presence or not. Given the special shape of the refrigerating element 11, when it is inserted into the inlet 104 by its lugs 18, 19, the lateral detectors 111*a* and 111*b* are equal to 1 whilst the upper detector 111*c* is equal to 0 until the lateral detectors 111*a* and 111*b* encounter the notches 24, 25 of said refrigerating element 11 when the switch to 0. The three detectors 111*a*, 111*b*, 111*c* must then be equal to 1, and vice versa when the refrigerating element is inserted by its upper face 26. If this code is right when the control and management unit 109 will allow a refrigerating element loaded with negative calories to be dispensed. If the contrary were the case, the "fraudulent plate" inserted shall be routed into the storage unit 107 where it shall be removed.

A cleaning device 112 for cleaning the refrigerating elements 11 to be recycled is provided between this inlet 104 and the storage unit 107. This cleaning device 112 comprises several pairs of cylindrical brushes 113, and in this case, three rotating pairs, arranged one after the other, the brushes of each pair being spaced out to define a more or less narrow passage to receive the refrigerating element 11 to be recycled, this passage extending from the inlet 104. An injector 114 is provided in the upper part of the cleaning device 112 and is used to spray a sterilising agent with an added cleaning agent and antifoaming agents in an aqueous environment, this agent coming from a fluid reservoir 115 and a pump 116. This sterilising agent is then recovered and evacuated through a pipe 115' to the refrigerating set's 150 condensates pan, this pipe passing through the housing's 102 walls. The rotation of the brushes 113 is controlled by a suitable driving mechanism and, e.g. a small motor coupled to the various brushes by means of a train of gears or a synchronous belt and pinions. The rotation of the brushes 113 drives the refrigerating element 11 to be recycled toward and up to the inside of the storage unit 107 through a tight door 117. This tight door 117 comprises for example flat brushes and thin rubber strips. Fixed rubbing elements 113' are arranged laterally and parallel to the direction of movement of the refrigerating element 11 driven by the brushes 113 and are designed to rub against the side faces 22, 23 of said refrigerating element 11 in order to slow it down to create a differential speed between it and said brushes and allow the latter to clean it effectively. These rubbing elements 113' are comprised for example of small brushes, rubber skids or other suitable devices.

After passing the tight door 117, the refrigerating element 11 to be recycled, not being guided anymore, swings under the effect of its weight and positions itself directly on the helicoidal storage and guide rail 108 which starts just after the tight door 117. Upper and lateral guide blades 118 and 119 are provided at the exit from the tight door 117 and above the upper zone 129 of the helicoidal rail 108 and they are arranged to position the refrigerating element 11 to be recycled properly on the helicoidal rail 108, even if the refrigerating element is inserted by its upper face 26. The refrigerating element 11 to be recycled then descends along the helicoidal rail 108 until it encounters the other refrigerating elements 11 which are already stored. During this time, it is loaded again with negative calories. In the lower zone 128, the helicoidal rail ends up in a rectilinear portion which is substantially perpendicular to the outlet 105 and stops to release a refrigerating element 11 loaded with negative calories and position it against a guide wall 126 so that it is substantially opposite the outlet 105. This outlet 105 is orientated substantially vertically or slightly inclined and its shape matches that of the refrigerating element 11 loaded with negative calories in the upright position and orientated sideways on. This orifice 105 is separated from the storage unit 107 by a tight door 120 comprising for example flat brushes and thin rubber strips. A ram 121 is mounted on the guide wall 126 to push the refrigerating element loaded with negative calories through the tight door 120 toward the outlet 105, this ram being controlled by the control and management unit 109 according to the limit switches 111*a*, 111*b*, and 111*c* and/or the slot paying mechanism. This ram's 120 rod moves parallel to the guide wall 126 and the outlet 105, and presents one rounded end 122 matching the semi-cylindrical notch 24 provided in the refrigerating element 11 in which it rests. Stops 123 are provided outside the wall 103 of the device 101, above and below the outlet, to keep the refrigerating element 11 loaded with negative calories in position and allow it to be gripped easily by the user.

The apparatus 101 is even easier and quicker to use than the manner described previously. The user inserts an refrigerating element 11 to be recycled in the inlet 104 and a few seconds later he receives in exchange a refrigerating element 11 loaded with negative calories ready for use, in the outlet 105. He may also purchase a refrigerating element 11 loaded with negative calories if he can not make an exchange. The control and management unit 109 provided in this apparatus 101 is a known device marketed under the trademark of VISIOCOM™ which is comparable to a PLC, which is used to remotely control and manage the refrigerating unit 150, control the brushes 113 and the ram 121, the stock of refrigerating elements 11 contained in the apparatus 101, the level of sterilising agent. It thus offers much appreciated versatility. For this purpose, a telephone socket 124 is provided at the rear of the housing 102 in addition to a power socket 125 for the apparatus which connects onto the 220 V mains with earth.

The present invention is not restricted to the examples of embodiment described above, but can be widened to include any modification or variation which is obvious for the expert. In particular, the slide provided in the first alternative embodiment may be replaced by any equivalent transfer means. Furthermore, the slide, the cleaning device and the swing may be activated respectively by control means equivalent to the rack. The apparatus according to the second alternative can also be provided with a double storage unit. The means of transfer by the brushes 113 and the ram 121 could be different. Finally, the apparatus for dispensing refrigerating elements has been described here as being used in a hypermarket. The side walls can be used as advertising media to promote new products. A space 127 with a 220 V power socket is provided on the upper part of the dispenser to install a video recorder and a television to inform the customers. However, the apparatus can be used in other locations, such as campsites, or motorway service stations. For example, truck drivers or holiday-makers have the possibility of always having a refrigerating element loaded with negative calories in their icebox. This allows them to transport their food safely throughout the whole journey. In such a case, a vandal-proof device can be provided for the dispensers placed outside.

I claim:

1. A dispensing apparatus (1, 101) for dispensing refrigerating elements (11) containing a substance formulated to accumulate negative calories, said dispensing apparatus comprising an exterior housing (2, 102) containing a storage unit (7, 107) therein for storing refrigerating elements, the housing further having a refrigerating device for transferring negative calories to any refrigerating element (11) stored within the storage unit (7, 107), an outlet (4, 105) being provided in a wall (3, 103) in the housing, a first transfer mechanism (30, 121) for transporting a stored refrigerating element, once sufficiently loaded with negative calories, from an exit of the storage unit (7, 107) to the outlet (4, 105) to facilitate use of said stored refrigerating element, and a control device for activating said first transfer mechanism (30, 121);

wherein said storage unit (7, 107) includes a helicoidal tube (8, 108) with one end thereof terminating at the exit of the storage unit (7, 107) whereby each refrigerating elements (11) becomes loaded with negative calories as the refrigerating element (11) travel along the helicoidal tube (8, 108), from an entrance of the storage unit (7, 107) to the exit of the storage unit (7, 107) during storage within the storage unit (7, 107); an inlet (4, 104) provided in the wall (3, 103) in the housing (2,102), and the housing (2, 102) further comprises a second transfer mechanism (30, 113) for transporting a refrigerating element (11) to be recycled from the inlet (4, 104) to an entrance of the helicoidal tube (8, 108).

2. The dispensing apparatus (1, 101) according to claim 1, wherein a second control device activates said second transfer mechanism (30, 113) to facilitate transfer of said refrigerating element (11) to be recycled from said inlet (4, 104) to the entrance of the helicoidal tube (8, 108).

3. The dispensing apparatus (1, 101) according to claim 2, wherein the helicoidal tube (8, 108) comprises a guide rail (9, 108) which facilitates guiding of the refrigerating elements (11) as the refrigerating elements (11) travel along the helicoidal tube (8, 108) within the storage unit (7, 107).

4. The dispensing apparatus (101) according to claim 3, wherein both the helicoidal tube and the guide rail are formed as a unitary structure.

5. The dispensing apparatus (1, 101) according to claim 3, wherein the dispensing apparatus (1, 101) further comprises a cleaning device (48, 112), located adjacent the entrance of the helicoidal tube (8, 108), for cleaning and sterilizing said refrigerating element (11) prior to said refrigerating element (11) traveling along the helicoidal tube (8, 108).

6. The dispensing apparatus (1, 101) according to claim 5, wherein said cleaning device (48, 112) comprises of a sterilizing agent injector (114) and at least one brush (113) for cleaning an exterior surface of the refrigerating element (11) to be recycled.

7. The dispensing apparatus (1, 101) according to claim 6, wherein the refrigerating element (11) comprises a substantially rectangular planar member, the refrigerating element (11) has a flared central orifice (14) extending for a front face to a rear face (12, 13) of said refrigerating element, the flared central orifice (14) has a substantially circular cross-sectional area which is greater in size than that of the helicoidal tube (8, 108) so that a lower rear end (15) of the flared central orifice (14) is spaced from said helicoidal tube (8, 108) and an upper rear end (16) of the flared central orifice (14) is tangent to said helicoidal tube (8, 108) at a point of contact which forms a support point (16) by which the refrigerating element (11) is supported on the helicoidal tube (8, 108).

8. The dispensing apparatus (1, 101) according to claim 7, wherein the refrigerating element (11) has a slot (17) extending from a perimeter of the refrigerating element (11) to the flared central orifice (14), and the slot (17) receives the guide rail (9, 108).

9. The dispensing apparatus (1, 101) according to claim 8, wherein the refrigerating element (11) has notches (24, 25) on opposed sides (22, 23) thereof to facilitate gripping by the first transfer mechanism (30, 121).

10. The dispensing apparatus (1, 101) according to claim 7, wherein the refrigerating element (11) has a center of gravity which lies below said supporting point (16) and the center of gravity is axially offset in relation to said support point (16).

11. The dispensing apparatus (1, 101) according to claim 7, wherein the refrigerating element (11) has a relief angle located below said supporting point (16), and said angle being formed by an angle of inclination of the rear face (13) of the refrigerating element (11) beneath the flared central orifice (14).

12. The dispensing apparatus (1, 101) according to claim 7, wherein the substance contained within the refrigerating element (11) is an eutectic liquid.

13. The dispensing apparatus (1) according to claim 2, wherein the first transfer mechanism (30) transports the stored refrigerating element (11), loaded with negative calories, to the outlet (4) and the second transfer mechanism (30) transports the refrigerating element (11), to be recycled, from the inlet (4) to the entrance of the helicoidal tube (8, 108), both the first transfer mechanism and the second transfer mechanism form a unitary transfer device (30) for transferring the refrigerating elements (11), and the outlet and the inlet are combined with one another to form a combined inlet and outlet for the refrigerating elements (11) such that said transfer device (30) can transfer the refrigerating element (11), loaded with negative calories, from the exit of the storage unit (7) to the combined inlet and outlet (4) while said transfer device (30) can simultaneously transfer the refrigerating element (11), to be recycled, from the combined inlet and outlet (4) to the entrance of the storage unit (7).

14. The dispensing apparatus (1) according to claim 13, wherein the transfer device (3) comprises a slide (30) supporting a gripping device (35, 42), the gripping device (35, 42) grips and carries the refrigerating element (11), stored with negative calories, vertically along the wall (3) of the housing (2) to the combined inlet and outlet (4), and a pushing device (45) is located to push the refrigerating element (11), to be recycled, from the slide (30) into the entrance of the storage unit (7).

15. The dispensing apparatus (1) according to claim 14, wherein gripping device (35, 42) for gripping and carrying the refrigerating element (11), stored with negative calories, is provided substantially on a lower part of the slide (30) and a window device (42) for the refrigerating elements (11), to be recycled, is provided substantially on an upper part of the slide (30), and said pushing device (45) for pushing the refrigerating element (11) to be recycled is provided so that the pushing device (45) corresponds to the entrance of the storage unit (7) such that the window device (42) can receive said refrigerating element (11) to be recycled, via the combined inlet and outlet (4), when said gripping device (35) grasps said refrigerating element (11), loaded with negative calories, from the exit of the storage unit (7) and the pushing device (45) pushes said refrigerating element (11) to be recycled to the entrance of the storage unit (7) when said gripping device (35) transfers said refrigerating element (11), loaded with negative calories, to the combined inlet and outlet (4).

16. The dispensing apparatus (1) according to claim 15, wherein the gripping device (35) comprises a pair of articulated branches (36, 37), the pair of articulated branches (36, 37) each has a gripping jaw (39, 40) for gripping one side (22, 23) of the refrigerating element (11) loaded with negative calories.

17. The dispensing apparatus (1) according to claim 15, wherein the window device (42) comprises an opening provided in the slide (30), and the opening has a shape which matches a shape of the refrigerating element (11).

18. The dispensing apparatus (1) according to claim 15, wherein the pushing device (45) includes a swing for pushing the refrigerating element (11) to be recycled to the entrance of the helicoidal tube (8).

19. The dispensing apparatus (1) according to claim 1, wherein the control device activates a slide (30) for transferring the refrigerating element (11) to be recycled, a pushing device (45) for pushing the refrigerating element (11) to the entrance of the storage unit (7, 107) and a cleaning device (48) for cleaning the refrigerating element (11) to be recycled.

20. The dispensing apparatus (1) according to claim 19, wherein at least one rack (51) extends along a side of the slide (30) while the pushing device (45) and the cleaning device (48) each, respectively, comprise at least one driving pinion that cooperates with and is driven by said rack (51).

21. The dispensing apparatus (101) according to claim 2, wherein the first transfer mechanism (121) and the second transfer mechanism (113) are distinct and separate from one another, the inlet (104) and the outlet (105) of the dispensing apparatus (101) are distinct and separate from one another, the inlet (104) is located adjacent to the entrance (129) of the storage unit (107) and the outlet (105) is located adjacent to the exit (128) of the storage unit (107).

22. The dispensing apparatus (101) according to claim 21, wherein the refrigerating element (11), loaded with negative calories, exits from a first end of the helicoidal tube (108) and rests against a guide wall (126) adjacent said outlet (105), and the first transfer device (121) comprises a ram (121) for pushing the refrigerating element (11), loaded with negative calories, from the exit of the storage unit (107) towards the outlet (104) of the dispensing apparatus (101).

23. The dispensing apparatus (101) according to claim 21, wherein the second transfer mechanism (113) comprise at least two cylindrical and parallel rotatable brushes (113) which move said refrigerating element (11), to be recycled, from the inlet (104) to the entrance of the storage unit (107), and at least one rotatable brush (113') is arranged parallel to a direction of movement of said refrigerating element (11), to be recycled, and rotates in an opposite direction to slow feed of said refrigerating element (11), to be recycled.

24. The dispensing apparatus (101) according to claim 21, wherein the dispensing apparatus comprises at least one detector (111*a*, 111*b*, 111*c*) located adjacent the inlet (104) for detecting presence of the refrigerating element (11) to be recycled, the at least one detector (111) is connected to the second control device (109) which controls the second transfer mechanism (113).

25. The dispensing apparatus (101) according to claim 24, wherein the dispensing apparatus (101) comprises two lateral detectors (111*a*, 111*b*) and at least one other detector (111*c*) for recognizing a shape of the refrigerating element (11).

26. The dispensing apparatus (101) according to claim 21, wherein the dispensing apparatus (101) comprises an inlet door and an outlet door (117, 120) for respectively closing the inlet and the outlet, and said inlet and outlet doors comprising flat brushes and rubber strips.

27. The dispensing apparatus (1, 101) according to claim 1, wherein the dispensing apparatus (1, 101) further comprises at least one paying mechanism (6, 106), connected to the second control means (109), for at least one of selling the refrigerating element (11), loaded with negative calories, and exchanging a refrigerating element (11), to be recycled, with the refrigerating element (11) loaded with negative calories.

* * * * *